US009779235B2

(12) United States Patent
Mertoguno

(10) Patent No.: US 9,779,235 B2
(45) Date of Patent: Oct. 3, 2017

(54) COGNIZANT ENGINES: SYSTEMS AND METHODS FOR ENABLING PROGRAM OBSERVABILITY AND CONTROLABILITY AT INSTRUCTION LEVEL GRANULARITY

(76) Inventor: Sukamo Mertoguno, Marlborough, MA (US)

( * ) Notice: Subject to any disclaimer, the term of this patent is extended or adjusted under 35 U.S.C. 154(b) by 0 days.

(21) Appl. No.: 12/250,949

(22) Filed: Oct. 14, 2008

(65) Prior Publication Data
US 2010/0107252 A1  Apr. 29, 2010

Related U.S. Application Data

(60) Provisional application No. 60/999,222, filed on Oct. 17, 2007.

(51) Int. Cl.
*G06F 11/00* (2006.01)
*G06F 21/55* (2013.01)
*G06F 21/52* (2013.01)

(52) U.S. Cl.
CPC .............. *G06F 21/55* (2013.01); *G06F 21/52* (2013.01)

(58) Field of Classification Search
CPC ........... G06F 21/50; G06F 21/52; G06F 21/55
USPC .......................................................... 726/23
See application file for complete search history.

(56) References Cited

U.S. PATENT DOCUMENTS

| | | | | |
|---|---|---|---|---|
| 5,608,866 A | * | 3/1997 | Horikawa | G06F 11/3466 714/39 |
| 7,493,439 B2 | * | 2/2009 | Gower et al. | 710/305 |
| 7,673,181 B1 | * | 3/2010 | Lindo | G06F 11/3612 714/38.13 |
| 2002/0171456 A1 | * | 11/2002 | Solomon | 327/113 |
| 2003/0126379 A1 | * | 7/2003 | Kaushik et al. | 711/150 |
| 2004/0128563 A1 | * | 7/2004 | Kaushik | G06F 1/3203 713/300 |
| 2005/0132338 A1 | * | 6/2005 | Kalra | G06F 11/3644 717/129 |
| 2006/0185014 A1 | * | 8/2006 | Spatscheck et al. | 726/23 |
| 2007/0011741 A1 | * | 1/2007 | Robert et al. | 726/22 |
| 2007/0245420 A1 | * | 10/2007 | Yong et al. | 726/23 |

(Continued)

OTHER PUBLICATIONS

Grizzard, Julian B., John G. Levine, and Henry L. Owen. "Re-establishing trust in compromised systems: recovering from rootkits that trojan the system call table." European Symposium on Research in Computer Security. Springer Berlin Heidelberg, 2004.

(Continued)

*Primary Examiner* — Esther B Henderson
(74) *Attorney, Agent, or Firm* — Nixon & Vanderhye P.C.

(57) ABSTRACT

The present invention is directed to system for and methods of real time observing, monitoring, and detecting anomalies in programs' behavior at instruction level. The hardware assist design in this invention provides fine grained observability, and controllability. Fine grained observability provides unprecedented opportunity for detecting anomaly. Controllability provides a powerful tool for stopping anomaly, repairing the kernel and restoring the state of processing. The performance improvement over pure software approach is estimated to be many orders of magnitudes. This invention is also effective and efficient in detecting mutating computer viruses, where normal, signature based, virus detection is under performing.

22 Claims, 9 Drawing Sheets

(56) References Cited

U.S. PATENT DOCUMENTS

2008/0016339 A1* 1/2008 Shukla .......................... 713/164
2008/0040707 A1* 2/2008 Araki ..................... G06F 11/28
　　　　　　　　　　　　　　　　　　　　　　717/127

OTHER PUBLICATIONS

Grizzard, Julian B., et al. "Towards a trusted immutable kernel extension (TIKE) for self-healing systems: a virtual machine approach." Information Assurance Workshop, 2004. Proceedings from the Fifth Annual IEEE SMC. IEEE, 2004.
Sultan, Florin, Aniruddha Bohra, Iulian Neamtiu, and Liviu Iftode. "Nonintrusive remote healing using backdoors." In Proc. 1st Workshop on Algorithms and Architectures for Self-Managing Systems, pp. 69-74. 2003.
Nachenberg, Carey, "Understanding and Managing Polymorphic Viruses", Symantec Enterprise Papers, vol. XXX, Sep. 1996.
"Understanding Heuristics: Symantec's Bloodhound Technology" Syniantec White Paper Series, vol. XXIV, Sep. 1997.

* cited by examiner

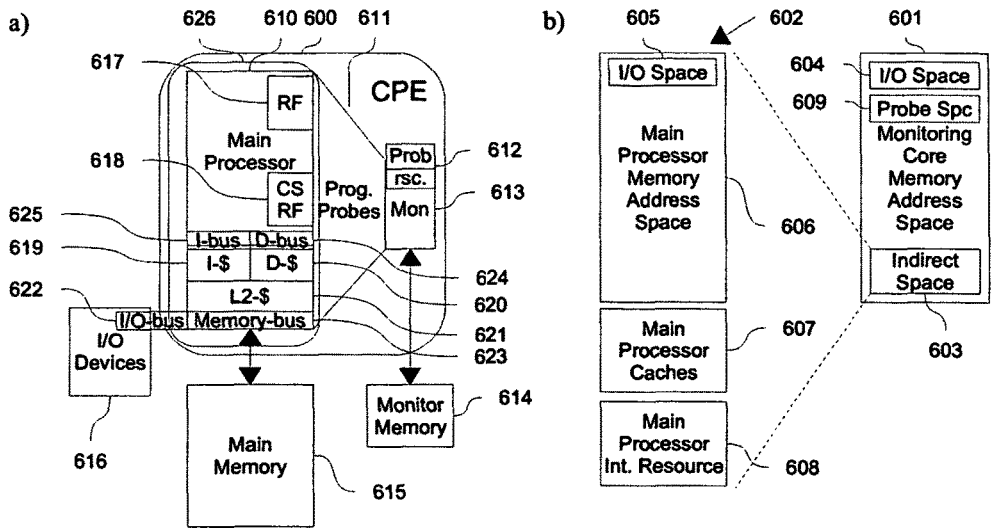

Fig. 6

Monitored/observable (readable and trap-able) processor states and resources

1. Register files (Int. & FP) <RF>
2. Control and Status registers <CSRF>
3. Data bus (data & address)
4. Instruction bus (data & address)
5. Memory bus (data & address)

Accessible (readable) processor resources

1. Caches (data section & tag section, indirect)
2. Memory (indirect)

Controllable (writable or excitable) processor resources

1. Register files (integer & floating point)
2. Control and Status registers
3. Caches (data section & tag section, indirect)
4. Memory (indirect)
5. Interrupt register and interrupt line
6. Power management registers and suspend/halt line
7. Reset register and/or line

Probe programmability

1. Event-0: Watch for operation (read/write) on resource, and generate trigger.
2. Event-1: Watch for value on resource, and generate trigger.
3. Event-2: Watch for sequence of events (0, 1 & 2), and generate trigger*.

* *Trigger notify monitor and potentially interrupt/halt main processor.*

Action toward main processors

1. Interrupt
2. Halt/suspend
3. Continue

Components and Resources for programmable probes

1. Banks counters
2. Banks of state machines
3. Operands memory (holds value to compare or temp parameter)

Fig. 7

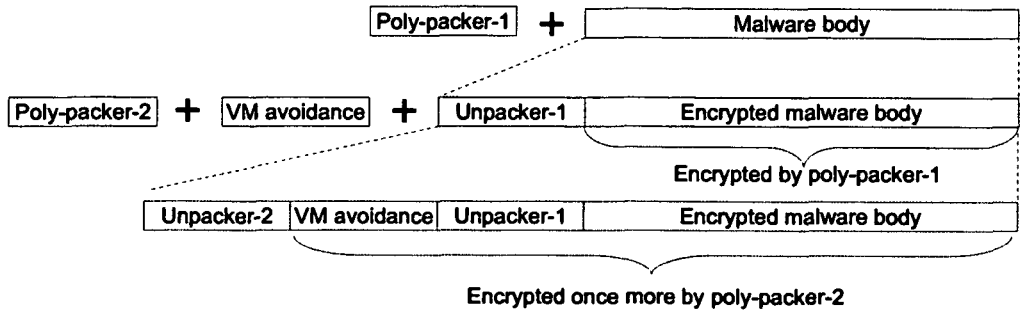

Fig. 11

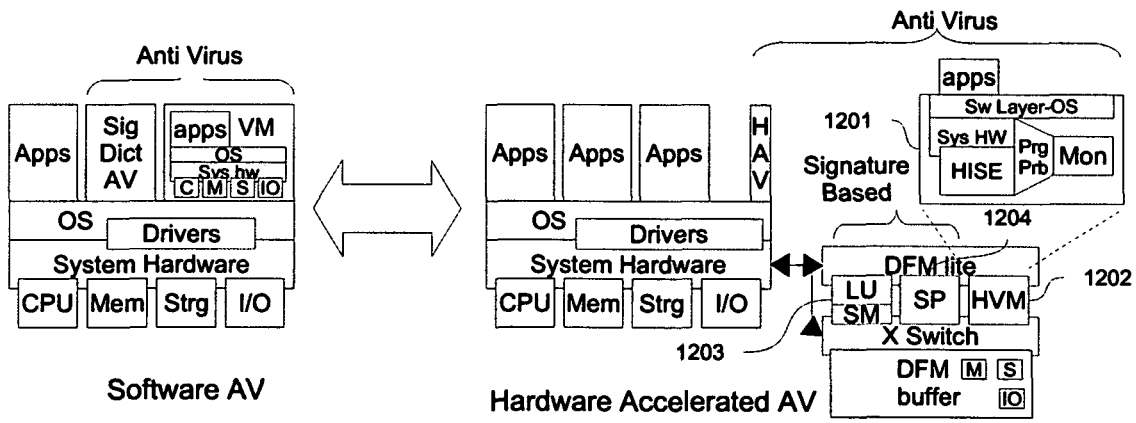

Fig. 12

Outline of an algorithm for defeating VM avoidance:

1. <u>First run</u>:
    1. Execute program under suspicion (PUS)
    2. Observe and detect anomaly
    3. Observe all branch points and create a map of the decision tree
1. <u>Subsequent runs, if no anomaly detected, until anomaly is detected, or decision tree exhausted</u>:
    1. Re-execute PUS
    2. At every mapped branch point, reverse the branch direction (by setting the status register with the appropriate value).
    3. Observe and detect anomaly
    4. Observe all branch points and annotate decision tree map

Fig. 13

| Class of malware | Detection method |
|---|---|
| Simple:<br>    binary, script,<br>    macro, trojan,<br>    backdoor, etc. | Signature database (regular expression or look-up) |
| Encrypted | Decryptor's signature database (regular expression or look-up) |
| Polymorphic | Execution monitoring, sand-boxing (emulator, VM) |

Fig. 15

COGNIZANT ENGINES: SYSTEMS AND METHODS FOR ENABLING PROGRAM OBSERVABILITY AND CONTROLABILITY AT INSTRUCTION LEVEL GRANULARITY

CROSS-REFERENCE TO RELATED APPLICATIONS

This application claims the benefit of provisional patent application Ser. No. 60/999,222, filed 2007 Oct. 17 by the present inventor.

FEDERALLY SPONSORED RESEARCH

Not Applicable

FIELD OF INVENTION

This invention relates to real time monitoring of the states and behaviors of computer program at the instruction level. It is designed for enhancing self-monitoring and self-protecting aspects of autonomic computing.

BACKGROUND OF INVENTION

In a highly interconnected systems, such as the global information grid, data security that extends to the end-nodes of the network is needed. Software applications that are vulnerable to malicious alteration, piracy, and reverse engineering can result in the compromise of command, control, and communication channels; as well as piracy and exploitation of central database servers and critical information systems. Operating system's (OS) kernel-mode software protection can protect applications by making them less accessible to the attackers. However, such solutions currently do not address the susceptibility of the technology to over-the-wire or insider attacks to the protecting functions of the kernel themselves. Susceptibility, in this case, is defined as the inherent weaknesses in the protection defenses. To provide immunity toward from attacks, it is important that the protecting functions of the kernel itself is secured. It is often necessary to isolate the protecting functions from the rest of the system.

Researches are being conducted in developing autonomic kernel self-monitoring, self-healing, and self-protecting technology as a means to reduce the susceptibility to attacks. In the context of software protection, kernel monitoring involves the static and runtime examination of the application as well as the associated kernel-mode protections. Kernel self-healing involves the diagnosis and repair of those modifications determined to be malicious in order to return to the original unaltered protection system. Kernel self-protecting systems are focused on adapting to the environment and improving the software protection system as necessary. These systems are able to observe their operational environment, detect possible attacks to the system, such as the deployment of reverse engineering tools or unauthorized read/write access, and take action in order to contain the attackers, deploy countermeasures, or adapt to increase the level of protection.

The finer granularity (deeper level) program behavior can be observed, the better chance of detecting anomaly. The finest granularity of program monitoring is at the instruction level, where the behavior of the program can be monitored for each transition of the execution state, at clock cycle granularity. To achieve instruction level observability, a pure software environment needs to run a very detailed virtual machine, which requires modeling of the processor, and simulating its operating environment at clock cycle granularity. This approach is very expensive in term of the computing power required. Current state of the art technology includes kernel runtime process monitoring, where both the kernel protections as well as the kernel monitoring, healing, and protecting components are in the kernel. In-kernel runtime process monitoring and healing system is embedded in the kernel it monitors. The fact that kernel and its protecting functions are not isolated, and interact with external environment, makes this approach susceptible to compromises. Thus this approach does not satisfy the requirement that the monitoring and self-healing system be immune to compromise [2].

Another state of the art technology includes hypervisor or virtual machine monitoring, detection, and repair of kernel-mode software protections. Hypervisor and virtual machine based provides isolation for the self-protecting system. It requires the kernel and the application runs in a virtual machine environment as guess operating system and applications, while self-protecting software runs on host operating system [2]. This approach rely on software (running in host OS) to monitor the behavior of other software (running on guess OS), and the guess OS itself it is necessary for this approach to instrument either the guess OS and/or the virtual machine itself with software probes, to monitor the execution of the guess kernel and its applications. These software probes introduce additional cycles to the already costly emulation or virtual machine implementation [3].

Another state of the art technology includes remote direct memory access (RDMA) technology, where the monitoring and healing components are on a remote host. Remote host monitoring uses backdoor mechanism, such as RDMA [3], to investigate the main memory of the system being monitored. Remote healing system copies memory content of the main system, into its working memory via backdoor (RDMA). It analyze it, and try to detect anomaly from the memory map of the main processor. Remote healing system can heal the monitored kernel by writing proper binary directly into the main system memory via RDMA. The only cost of this approach to performance of the main system is the additional bus & memory bandwidth cost due to RDMA/monitoring activities. It is not clear how often does the main memory of the system need to be copied to the remote monitor and analyze, to have an acceptable protection without overburdening the system being monitored with additional RDMA accesses. The fact that main memory need to be copied, and then analyzed implies that there is significant latency required for detecting anomaly. This technique can not observe the state of the process in true real-time fashion.

The object of this invention is a hardware assisted systems and methods for real-time monitoring execution of programs at the most elementary level; the instruction level. The family of systems and methods in this invention are called cognizant engines family. The hardware assist design, in this invention, provides not only observability, but also controllability at this level. Fine grained observability provides unprecedented opportunity for detecting anomaly. Controllability provides a powerful tool for stopping anomaly, repairing the kernel and restoring the state of processing. The performance improvement over pure software approach is estimated in the order of 500 to 1000 times. The hardware assisted monitoring, in this invention, is very valuable in detecting mutating (polymorphic) computer viruses, where normal, signature based, virus detection is under performing. The controllability aspect of this invention allows for defeating advanced detection avoidance logic deployed by advanced polymorphic and metamorphic malwares. Accordingly, members of cognizant engine family have the following advantages:

- Cognizant processing engine family provides observability (monitoring capability) at the deepest level of granularity, the machine instruction level.
- It supports real-time monitoring of program behavior, at clock cycle granularity.
- Cognizant engine family member provides low latency from the detection of suspicious event or anomaly to the time when appropriate action can be taken, due to the fact that probes can be programmed to take immediate action, by halting or interrupting the processor, within 2 to 3 cycles latency.
- Implementation of cognizant processing engine on a host processor has low performance impact. The only impact to the main processor is when it is interrupted or halted by the probe or monitor due to detection of a critical event. The software and operating system running on the main processor do not need to be instrumented.
- Cognizant engine family's hardware based isolation for the monitoring program, protects the monitoring program from being tampered.

Other advantages includes:

- Cognizant engine family provides controllability at the finest granularity. The monitoring core can modify all of main processor resources, including main memory, control and status registers, register files, caches, etc.
- The monitor in the embodiments of cognizant engine family, provides controllability to the execution path of programs running on the main processor. The fact that monitoring core can access (write) branch status register, it can steer the program execution path. This feature is valuable in defeating the detection avoidance logic of a polymorphic malware.
- Early detection and low latency action, reduce compromise or damage to minimal, and hence simplifying and reducing self-healing effort.

The following are the references cited in above paragraphs:

1. Julian B. Grizzard, John G. Levine, and Henry L. Owen, "Reestablishing Trust in Compromised Systems Recovering from Rootkits that Trojan the System Call Table,"
2. Julian B, Grizzard, Eric R. Dodson, Gregory J. Conti, John G. Levine, and Henry L. Owen, "Towards a Trusted Immutable Kernel Extension (TIKE) for Self-Healing Systems: a Virtual Machine Approach",
3. Florin Sultan, Aniruddha Bohra, Julian Neamtiu, and Liviu Iftode, "Nonintrusive Remote Healing Using Backdoors,"
4. Carey Nachenberg, "Understanding and Managing Polymorphic Viruses",
5. "Understanding Heuristics: Symantec's Bloodhound Technology",

SUMMARY OF THE INVENTION

Embodiments of the present invention are directed to systems for or methods of real time program monitoring at instruction level. The hardware assist program (software) monitoring design in this document provides observability and controllability of program execution. Fine grained observability provides unprecedented opportunity for detecting anomaly. Controllability provides a powerful tool for stopping anomaly, repairing the kernel and restoring the state of processing.

One embodiment of the cognizant engine family, referred to as cognizant processing engine a.k.a CPE 100 is shown in FIGS. 1a and 1b. CPE is designed to provide real-time, low latency, and efficient monitoring. First aspect of CPE architecture is a method for employing programmable hardware probes 104 to observe the state of the processing in the main processor subsystem 107 (or the combination of 101, 102, and 103). Each of these hardware probes can be set to detect a single or a set of value or events. Upon detecting the value or event of interest, a probe generate a signal or event to notify the monitor 105.

Second aspect of CPE are controlled from a programmable monitor 105 for controlling said programmable probes 104 and for maintaining the states of monitoring processes. The programmable monitor 109 defines values and events for the probes 108 to detect, receives signals and events from the probes, maintains the state of monitoring, and as necessary intervenes the execution of a program running on the main processor 107. Intervening in this case includes halting, examining, and potentially modifying the state of processing by modifying data in, or content of the processor resources, including but not limited to memory, caches, registers/register-files, control and status registers, interrupt register, etc.

Third aspect of CPE is that the monitor is the isolates subsystem 109, and that the access direction is one-way accessibility from the monitor 109 to the main processor subsystem 107. Monitor has read and write access to all of the main processor resources, while monitor's resources are not accessible from the main processor. The monitor 105 has complete control of the main processor behavior, but it is not controllable by any program running on the main processor 101. Cognizant processing engine further provides isolation to the monitoring process, by employing a separate working memory 106 for the monitoring core 105. Isolated subsystem and one way access provide the monitor with immunity against externally (outside of the monitor) induced compromises. In cognizant processing engine concept, the task of investigating and diagnosing the problem becomes the responsibility of the program running in the monitoring processor core, as depicted in FIG. 2. The programmable probes 203/212 monitors 204/213 the program execution in the main processor 201/220 and provides information and point/event of interest 205/214 to the monitoring core. The monitor 202/211 acts as the supervisor or master in the system. The main processor 201/220 is the workers or the production system, and in a way a slave to the monitor. The monitor has full visibility into the state and resources of the processor via the programmable set of probes 203/212. Upon receiving the event of interest, the monitoring core can perform further investigation or diagnostic 207/217, updates its internal state 206/216, and it may (or may not) take action 208/218 to the main processor. However, there are cases of critical events, in which upon occurrence of these events, the proper action 218/208 is to halt the main processor as soon as possible. For said cases, upon detecting said events, the probes can be programmed to halt 215 the main processor immediately, along with reporting 214 said events to the monitor core. FIG. 2 shows the potential sequence of activities within the cognizant processing engine concept.

The cognizant processing engine concept, has very little (insignificant) impact on the main processor's performance, since all of the probing and monitoring activities are done by the programmable hardware probes and the monitoring core. Employing cognizant processing engine enables timely detection of a particular event or a particular sequence of events, along with halting the main processor, and preserving of the current state of execution. The fact that the behavior of the program running in the main processor can be observed 204/213 in clock cycle granularity, and action/control (halt, or interrupt) 208/215/218 can be injected to the main processor within 2 to 3 cycle latency, provides unprecedented real-time observability and controllability of the processes, beyond any other techniques previously described. Cognizant engine allows stopping a rogue processes as soon as they are detected, before they can do too much damage. Once an event is detected, if necessary, the state of the execution can be further investigated 207/217 by the monitor. Anomaly/damage can easily be repaired as soon as it is detected, and processor can continue its execution properly. Thus, it simplifies the effort for repairing the kernel. This concept will prove valuable in detecting mutating polymorphic and metamorphic malwares, where normal, signature based, virus detection is under performing. The controllability provided by CPE, where the direction of the execution of a program running in the main processor can be steered by the monitoring core, provides a way for defeating advanced malwares equipped with detection avoidance function. In another embodiment, suitable for implementation on main processor with hypervisor hardware support, is called Cognizant Hypervisor Processing Engine (CHPE), as shown in FIG. 3. In this embodiment, programmable hardware probes 305 are added into the architecture of said processor circuitry 301, 302, and 304. The monitoring function in this embodiment is performed using the main processor functionalities within the hypervisor 304 mode. To provide isolation, a section 307 of the hypervisor section of the main memory will be reserved for running the monitor program(s). This section 307 of the memory 306 is not accessible to any other program in the system, besides the monitoring program. This approach is a (circuit-wise) less expensive method of implementing cognizant engine in a processor with hypervisor support. The drawback is that the monitoring function, executed within the main processor, is contributing to the total processing load of the main processor. However, it is expected that this additional load is a small percentage to the total load of the processor, and is multiple order of magnitude smaller than that of a pure software solution.

In another embodiment, suitable for implementation on a multi-threaded main processor, is called Cognizant Thread Processing Engine (CTPE), see FIG. 4. Similar to CHPE above, in this embodiment, the monitoring function is executed by the main processor 401. Specifically by one of the thread 404 dedicated for monitoring. Hardware probes 405 are added into the circuitry of a multi-threaded processor 401. Upon detecting event or value of interest, the probes notify the monitor control 403, and monitoring thread or task will be activated for determining the next step and to update the state of monitoring. The particular monitoring thread 404 can still be made available for processing normal (other) programs. In this case, when the probes 405 detect an event or a value of interest, it will notify the monitoring control 403. In this case, a program which happens to run on the dedicated thread 404 will be suspended, and swapped out. The monitoring program is then swapped in to run on the dedicated thread 404. Upon its completion, the suspended thread will be restored, and its execution will be continued. A portion 407 of the main memory is reserved for the monitoring program. Monitor control 403 guarantee that this portion of memory 407 is exclusively accessible only from the monitoring thread, running monitoring program, to provide isolation of the monitoring process from other processes.

In another embodiment, where the main processor is not available for modification, Cognizant Emulator subsystem (CES), which is depicted in FIG. 5, can be deployed. CES provides an instrumented hardware virtual machine. This embodiment of cognizant engine can be viewed as a very high performance and power efficient virtual machine based monitoring system. It was designed as an add-on and plug-in subsystem for an existing computing system as an accelerator for malware (virus) detection application, particularly the mobile computing and smart-phone system. At the center of this subsystem is a hardware instruction set emulator (HISE) 501, instrumented with programmable probes 504, and a monitor 503. The hardware instruction set emulator 501 represent the main processor. A program executed on said emulator 501 is observable from the programmable probes 504 and its state of execution is observed and controlled by the monitor 503. The advantage of this embodiments is that it can be plugged-in to an existing system without modification of the processor. It is however requires a program to be loaded into and executed in CES for malware detection purpose. Hence, it is less efficient than all of the other embodiments described above, but is still many order more efficient than a pure software base malware detection techniques.

BRIEF DESCRIPTION OF THE DRAWINGS

FIG. 6. depicts a more detailed diagram of Cognizant Processing Engine, showing its monitored resources, resource access, and memory maps FIG. 7. shows a summary of a specification for a typical cognizant processing engine, defining its functionality, accessibility, controllability, and programmability FIG. 8. shows a Cognizant Hypervisor Processing Engine.

FIG. 12. depicts an example of hardware accelerated anti virus system.

FIG. 13. provides an outline of an algorithm for defeating VM avoidance using Cognizant-Emulator.

FIG. 15 shows a summary for malware detection methods.

DETAILED DESCRIPTIONS OF PREFERRED EMBODIMENTS

Figure 1A:
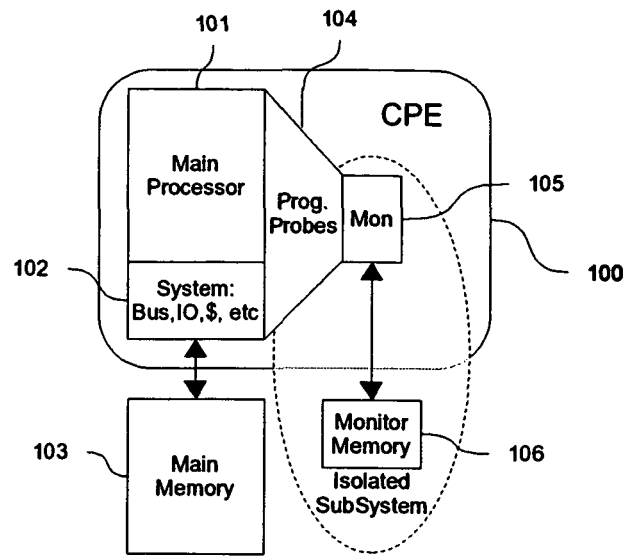
FIG. 1a. shows the Cognizant Processing Engine concept, with isolated monitoring subsystem FIG. 1b. depicts the one way access configuration of cognizant processing engine.
Figure 1B:
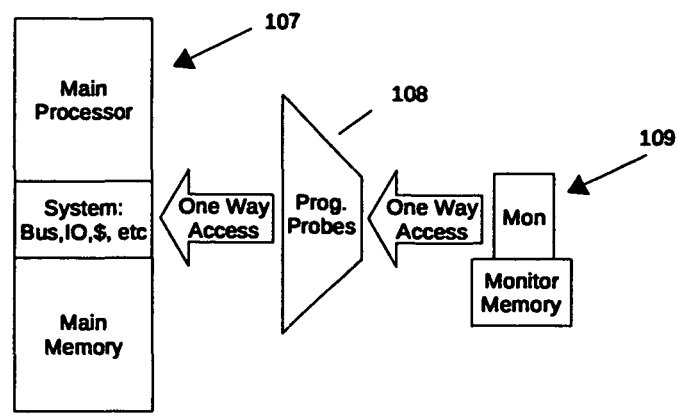
Figure 2:
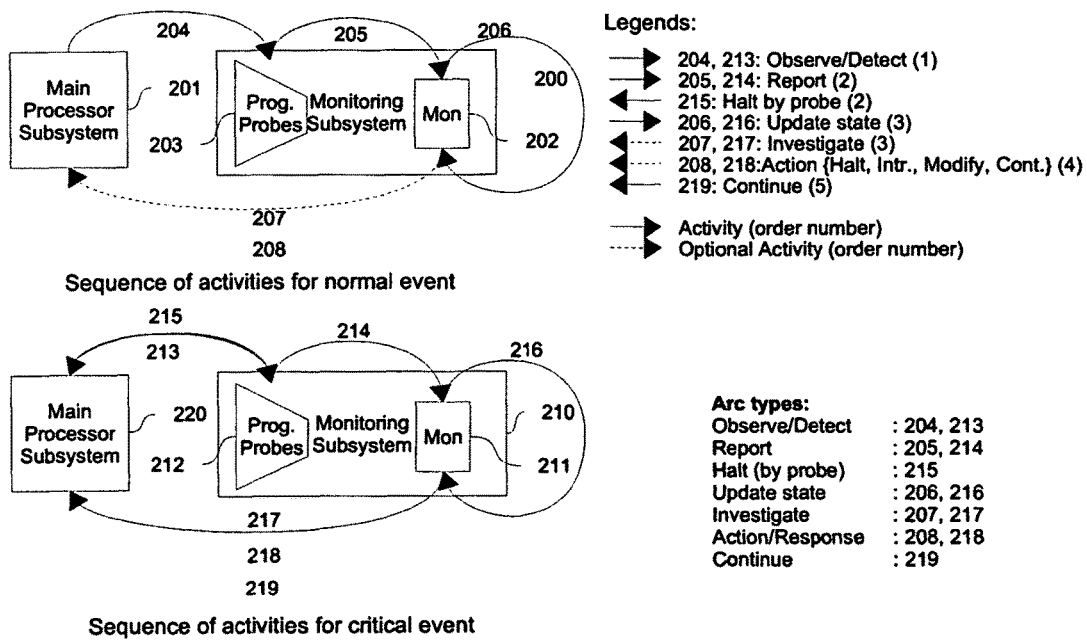
FIG. 2. shows a typical sequence of activities for cognizant processing engine concept.
Figure 3:
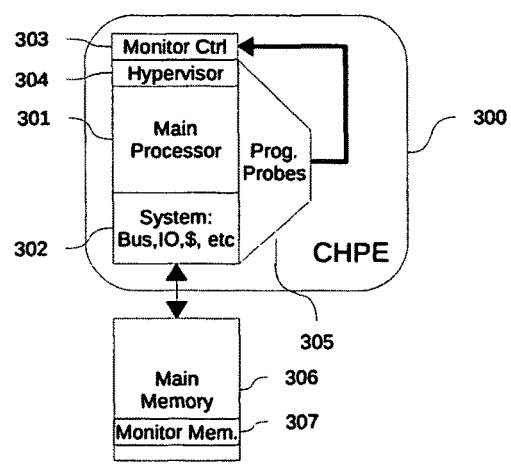
FIG. 3. shows the Cognizant Hypervisor Processing Engine.
Figure 4:
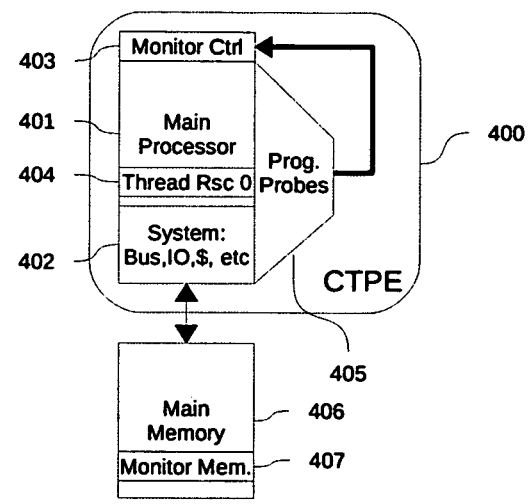
FIG. 4. shows the Cognizant Thread Processing Engine.
Figure 5:
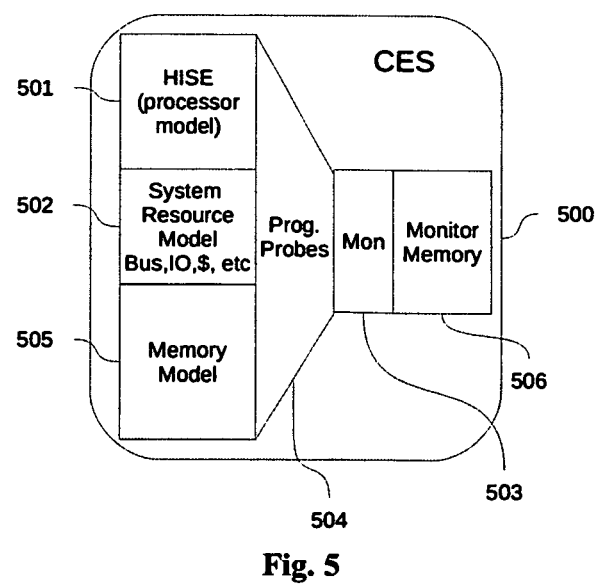
FIG. 5. shows the Cognizant Emulation subsystem.

A preferred embodiment of Cognizant processing engine, consist of a processor 626, instrumented with programmable probes 611, and 612, and equipped with a monitor core 613, which may be a simple processor, a micro controller, or a programmable hardware state machine. CPE can be constructed by instrumenting selected general purpose main processor such as x86, SPARC, MIPS, etc, with a set of programmable probes, and by adding a programmable state machine or a simple embedded core such as ARM, NIOS, MicroBlaze, ARC, etc., or any 16 bit or 32 bit microcontroller, to act as the monitor for the probes. The monitoring processor may run in much slower, at a fraction of the main processor's clock speed. The programmable probes operate at the clock speed of the main processor.

FIG. 6. shows a preferred embodiment of cognizant processing engine. In the preferred embodiment of FIG. 6, the monitoring core 612 is connected to the programmable probes 611 and the programmable probe resources 613. The programmable probes 611 is connected to the main processor 624. The probes 611 has read and write access into the main processor 626 internal resources, such as all register files 617, control and status register file 618, internal caches 619, 620, and 621, and all of the processor buses 622, 623, 624, and 625. The monitor control the behavior of the probes by setting appropriate values in the probe resources 613. The probe resources are directly addressable from the monitoring core. A section of the monitoring core address space 601 is dedicated as probe space 609 for addressing the probe resources. All of the main processor internal resources and the main memory 102 are accessible, (readable and writable), by the monitoring core 612. Monitor core address all of the main processor internal resources and addressable memory 602 via indirect address space 603 within the monitor address space 601. Indirect access in this case means that an access to a particular location in the main processor memory, or internal resources is done by writing a starting address to a remote location, a data length, a command and a data, in case where the operation is a write. The result of the indirect access can be read from a register, a set of registers or a predetermined local memory location. An indirect read access is initiated by writing the address of a remote location, the length of data desired, and a read command into a predetermined registers. The result for the read transaction can be retrieved from a predetermined register, set of registers, or memory location, depending on the design. An indirect write access can be initiated by writing the starting address in the remote target location, optionally the data length, the data to be written itself, and a write command into a particular set of registers, and/or local memory location. The status for the remote write operation can be retrieved from a predetermined register or local memory location. A typical specification of an embodiment of a CPE system can be summarized in FIG. 7.

Figure 8:
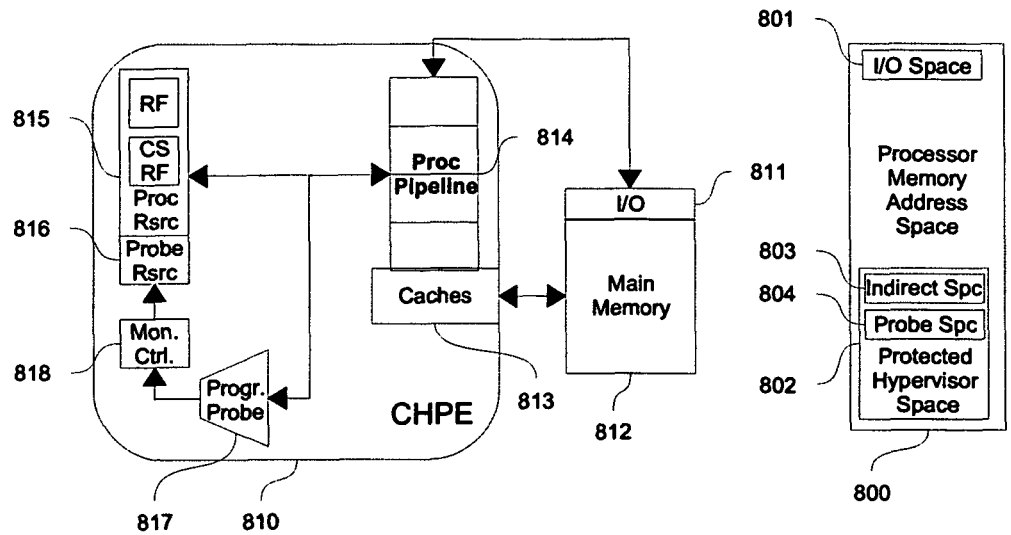

Another embodiment is the cognizant hypervisor processing engine (CHPE), see FIG. 8. CHPE is a variation of cognizant processing engine with a main processor that support hypervisor. In this embodiment, a programmable monitoring core is not required. The hypervisor support logic in the main processor can provide isolation to the monitoring process. The monitor functionality can be executed as part of the hypervisor programs. In this embodiment, the probes 817 are connected to the processor's pipeline 814 and the monitor control logic 818. The monitor control logic 818 manages the invocation of the monitoring process, and is connected to the processor resources 815, and 816. The probe resources 816 become an extension to the main processor resources 815. In this embodiment, monitoring function is a program which run in the protected memory space in the hypervisor memory space 802. It can access all of the addressable processor resources 800 directly. An indirect space 803 within the hypervisor address space 802 is used to access hardware resources which are not addressable/accessible by a normal program, such as individual cache line, cache tags, some fields in the status and control registers, and all other resources which are not accessible by software in a typical processor.

Figure 9:
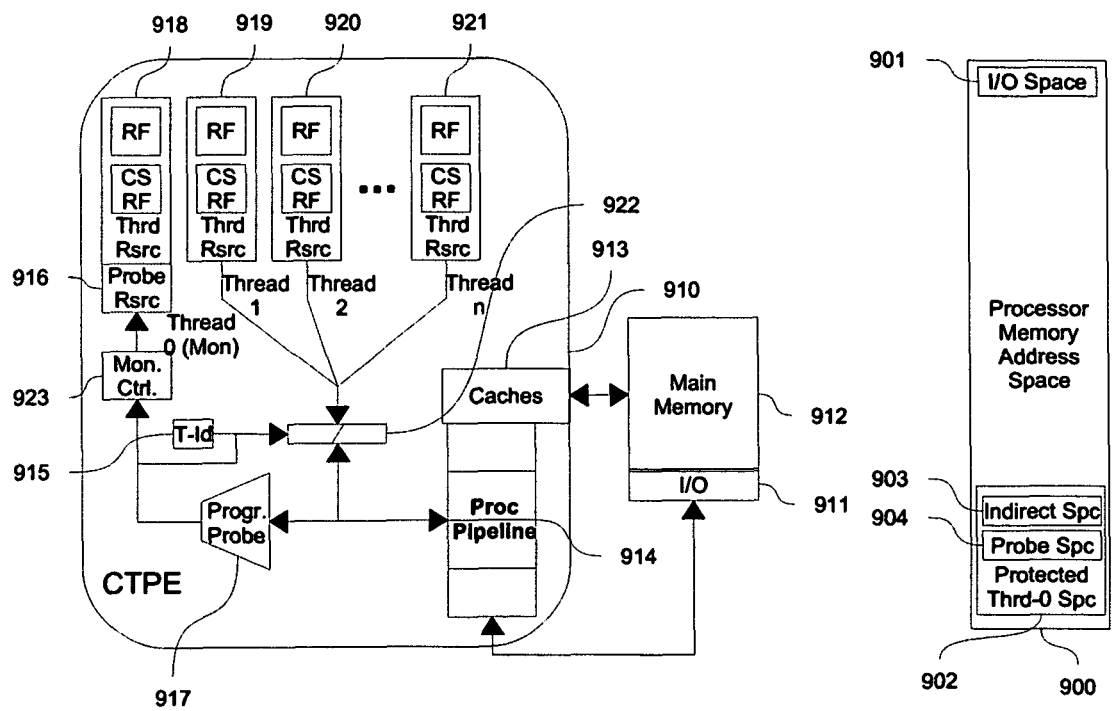
FIG. 9. shows a Cognizant-thread in a multi-threaded processor.

Cognizant thread processing engine (CTPE), depicted in FIG. 9, is another embodiment within the cognizant engine family. In this embodiment, the main processor supports multi-threading or simultaneous multi-threading. The address space for CTPE 900 is similar to that of CHPE 800. Additional hardware need to be added to guarantee isolation of the monitoring thread space 902, if the multi-threaded processor does not have support for hypervisor. Similar to the CHPE, an indirect address space 903 within the monitor address space 902, is used to access processor resources which are not normally accessible from software. In this embodiment, the programmable probe 917 monitors and is connected to the processor pipeline. It also monitors the active thread resources via a multiplexer 922 controlled by the thread number (thread-id) 915. There can be more than one active threads at any given time, if the main processor supports simultaneous multi-threading. The output of the programmable probe 917 is connected to monitor control logic 923, which in turn is connected to the monitoring thread resources 916, and 918. The monitoring control logic 923 manages the invocation of the monitoring process. The thread-id 915 is also connected to the monitor control logic 923. The value of 915 will be recorded in the thread resources 916 when at least one of the programmable probes create an event to the monitor control logic. The recorded value of thread-id 915 provides information regarding which thread the event of interest was detected, to the monitoring thread/process.

Existing self-monitoring and self-healing system rely completely on software, or remote hardware system for detecting any anomaly. Remote hardware monitoring systems rely on the main memory dump via RDMA, for self-monitoring, and hence it is always working on past processing state (thousands of cycles in the past). It can not react in real-time. Software based approach, either in kernel or hypervisor based, although can not react as quickly (higher latency) as a hardware assisted approach and slows down the processing significantly, can potentially observe the current state of processing, by instrumenting the guess operating system, and/or the processor emulator. To achieve high level of observability, the number of cycles taken by the software probes (instrumentation) will be quite large and expensive. It will not be practical for software based monitoring to have an observability of the instruction level, since it would mean to have to monitor every single instruction executed, and hence, will slow the system down significantly.

To provide real-time, and low latency monitoring, Cognizant-engine family members; CPE, CHPE, and CTPE, employ a set of hardware probes to observe the state of the processing. These programmable probes are controlled by a programmable monitor. In a system based on said embodiments, the state of processing can be observed and controlled at the granularity of instruction level at each clock cycle. In said embodiments, the state and execution of a program can be observed not only at the main memory, but also at the internal resources of the (main) processor. Cognizant processing engine family provides isolation to the monitoring process by employing a separate working memory for the monitoring core. The cognizant processing engine concept, has very little (insignificant) impact on the main processor's performance, since all of the monitoring activities are done by separate hardware monitoring subsystem.

The fact that the behavior of the program running in the main processor can be observed in clock cycle granularity, and action or control (halt, or interrupt) can be injected to the main processor within 2 to 3 cycles latency, provides unprecedented real-time observability and controllability of the processes, beyond any other techniques previously described. It enables the stopping of a rogue processes as soon as they are detected, before they can do too many damages, hence simplifying the effort for repairing the kernel. Employing cognizant processing engine enables timely detection of a particular event or a particular sequence of events, along with halting the main processor, if necessary, and preserving of the current state of execution. Once an event is detected, the state of the execution can be investigated further by the monitor. Anomaly/damage can easily be repaired as soon as it is detected, and processor can continue its execution properly.

Figure 10:
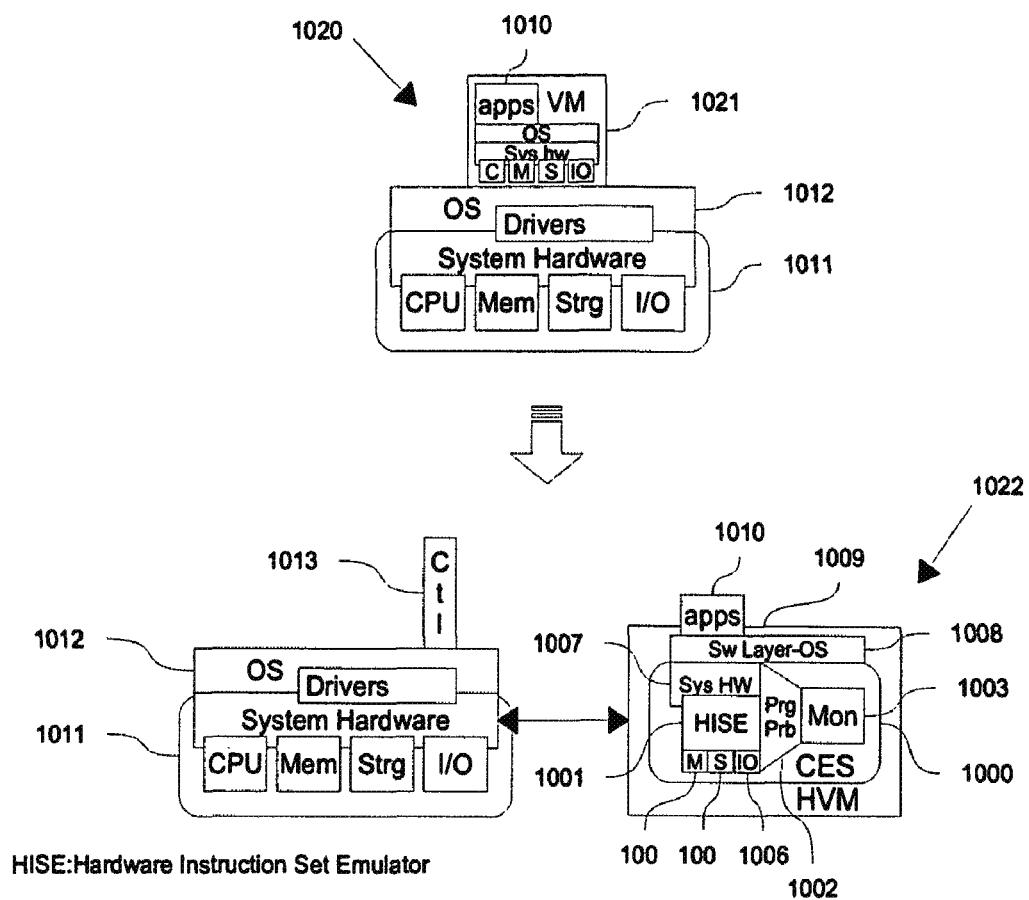
FIG. 10. shows a Cognizant Emulator Subsystem, for accelerating virtual machine based monitoring FIG. 11. shows the construction of polymorphic malware with VM avoidance logic.

Cognizant emulator subsystem (CES), see FIG. 10, is another embodiment within cognizant engine family, specially designed for deployment in a system whose main processor is not available for modification. It is designed to be a plug-in or add-on subsystem to an existing processing system. In this embodiment, programs run on CES for detection, as a precursor to being certified to run on the main processor. From application software 1010 point of view the system environment in CES subsystem is identical to that of the main processor. In this embodiment, the role of the main processor is played by the hardware instruction state emulator (HISE) 1001. The main memory, storage system, I/O and other system's hardware are emulated by 1004, 1005, 1006 and 1007 respectively. HISE 1001 implementing instruction set in hardware. However, HISE can not be considered as a full blown processor, since it only implement the instruction set functionality at the architectural level, but not at the micro-architectural level. It emulates the execution of the instruction set faithfully, but does not preserve or emulate processor's latency for each instruction. The rest of the architecture, such as interrupt structure, memory management, memory hierarchy, etc, may not be emulated as faithfully. Hardware 1002, 1004, 1005, 1006 and 1007, emulate the behavior of the main computer/processing system 1011. The software layer 1008 emulate the operating system's 1012 behavior. As with software based virtual machine 1021, the hardware accelerated virtual machine (HVM) 1022 can isolate the execution of a program (sand-boxing) relative to the host system 1011. Virtual machine is often used to evaluate suspected application program, in isolation, without risking contamination (compromising) of the main/host system. HVM requires a controller 1013 running in the host system 1011 to transfer and run application on the HVM subsystem 1022. A set of programmable probes 1002 are connected directly to the 1002, 1004, 1005, 1006 and 1007. The probes 1002 are connected to the monitoring logic 1003. The probes watch targeted values and signals in the hardware emulator 1002, 1004, 1005, 1006 and 1007. The probes 1002 notify the monitor 1003 in case they find a value or event they are looking for. The monitor 1003 updates its internal state, and set up the probe to look for the next event or value of interest. When the internal state of the monitor indicates that an anomaly has been detected, it label the application software 1010 as unsafe. Otherwise, if the application program 1010 successfully run without causing any anomaly, it is considered as safe to run on the main processor.

CES was initially designed for detecting mutating computer viruses or malwares. It was designed as an add-on to an existing mobile computing system, particularly the smart-phones, where the issue of power is critical. CES is designed to achieve the required performance with minimal impact on power requirement.

Computer viruses and other types of malwares have evolved from a simple, straight-forward implementation into a complex and encrypted version, and further into a mutating (polymorphic and metamorphic) ones, to stay one step ahead of the anti-malware vendors. FIG. 15 summarizes the type of malwares and their typical detection methods. Undetectable by signature scanning method, poly/meta-morphic malware will prove to be too expensive for network-based anti-malware appliance, at the telecommunication central office, to capture. The latest version of computer viruses employ avoidance techniques against detection by sand-boxing. FIG. 11. shows a typical construction of a polymorphic virus with VM/sand-boxing avoidance functionality. Sand-boxing is needed to isolate the execution of the suspected program from the rest of the system, as not to contaminate the main system. Virtual machine (VM) or sand-box used in malware detection is also required to provide visibility or observability (probing) into the internal state of processing at deeper level granularity that what can be provided by the relatively inexpensive 'native execution' sand-boxing, such as the one used by VMWare. Native execution sand-boxing is relatively inexpensive and provides good process isolation, but it only provides very limited visibility/observability into the processing state. The malware detecting virtual machine requires the use of instrumented software emulator of the processor and system hardwares, for observing the behavior of a program at instruction level granularity.

Anti-virus (malware) softwares have been widely used in PCs and laptops, especially for the ones running MS Windows operating system. They are notorious for significantly slowing down the performance of the system. The computing and power requirement of the anti-virus software grows as a function of number of files in the system and number of malwares to be checked. Enter the new mobile devices such as PDAs and smart-phones. These devices are as connected as PC or laptop, but has much less processing power than the normal PC, and most operate solely on battery power. These devices can not tolerate the heavy load of anti-malware software, in term of performance and power/energy requirement.

FIG. 12 shows an equivalence of a system with anti-virus software, and a system with hardware accelerated anti virus, employing CES. CES based hardware virtual machine 1201 or 1202, along with hardware for handling regular expression 1204 and look-up unit 1203, are used to accelerate malware detection process. Said hardware based system improves performance and reduces energy/power requirement. Hence it is suitable for battery powered devices. FIG. 12. depicts an example of such system. Being a hardware based approach, CES provides the required performance, while requiring significantly (many order) less power than any pure software approach.

Malware's VM/detection avoidance technique often checks certain parameters or variables, before it allows the decryption or execution of virus body to continue. Hence, it often defeats VM based detection, which can not anticipate the proper responses to VM/detection avoidance mechanism's queries. The fine grained (register level) controllability along with real-time event detection allows CES to defeat the malware's VM avoidance mechanism. FIGS. 13 and 14 describes an outline and flowchart of an algorithm for defeating VM/detection avoidance mechanism.

Controllability over branch status register allows cognizant processing engine to reverse the branch direction of the program under suspicion (PUS). Controlling the branch status register can be considered as controlling the faithfulness (or essentially controlling the processor/hardware to lie) toward said PUS (software). Reversal of the branch direction, at the check point used by the malware's VM/detection avoidance mechanism, will expose the malware in the subsequent run, even if it succeeded in avoiding the initial detection. This algorithm, if implemented in software, requires a very detailed hardware model/emulator, and will become prohibitively expensive.

Figure 14:
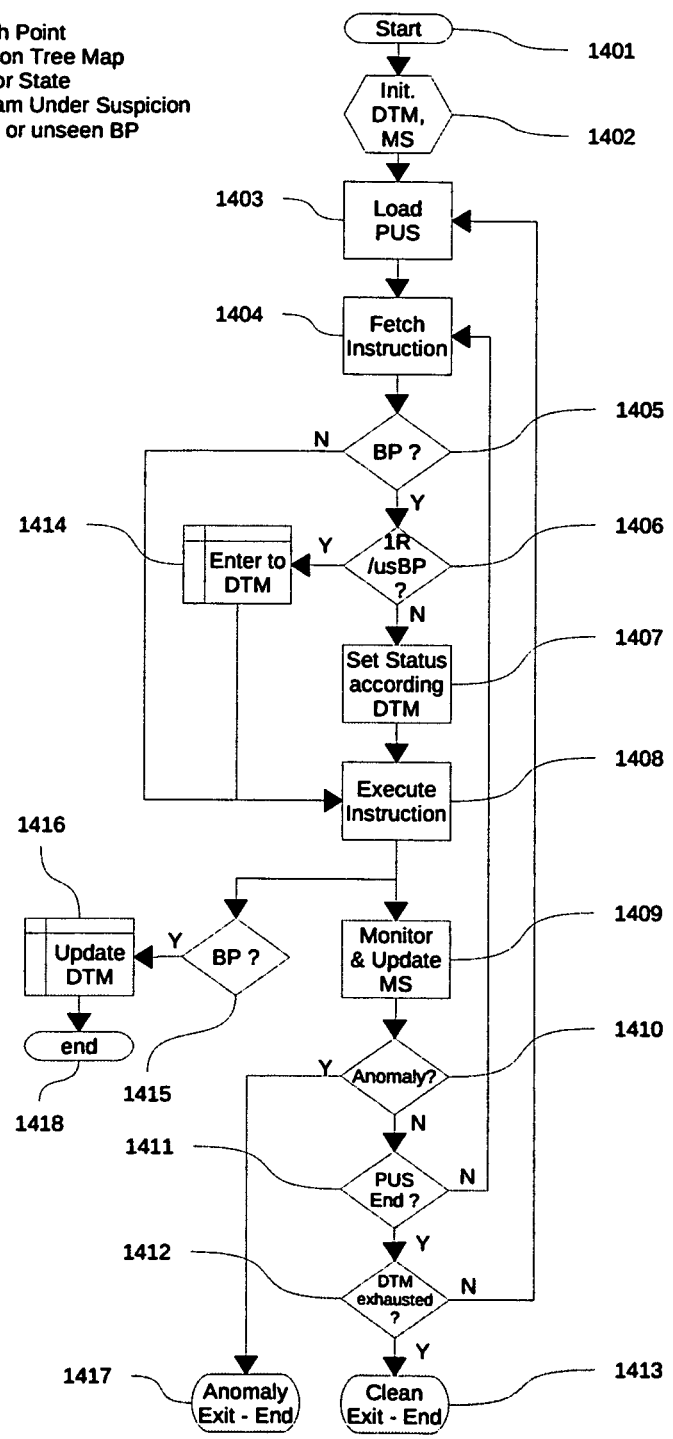
FIG. 14. shows the flow chart for the algorithm outlined in FIG. 13.

In the algorithm of FIGS. 13 and 14, the first run or first iteration of PUS during detection process is a normal one, similar to any emulation or virtual machine based detection, with additional step where branch point identifications of all conditional branch points in the execution of the PUS are recorded into a table called decision tree map (DTM) 1414, along with information regarding which bit in the status register which is used to resolve the corresponding branch point. Branch point identification includes but not limited to the branch instruction address and the position of the branch point in program execution. A new entry will also be recorded into said DTM 1414, in the subsequent iteration if the branch point has not been reached/seen before. Following the execution of a branch point 1415, the DTM will be updated 1416 with information regarding the direction said branch point must be set/directed for the subsequent iteration, and the status of said branch point entry itself. Detection process ends with anomaly detection 1417 when the monitor detection state machine 1409 detect anomaly 1410. Subsequent iterations will be performed 1412 if the execution of the program ends 1411 without detecting anomaly. In subsequent iterations, when a branch point is reached 1415, the status bit will be set according to DTM 1407, before said branch is executed 1408. The detection process exit without detecting anomaly 1413, when the programs under suspicion (PUS) terminates 1411, and all possible combinations in DTM have been exhausted 1412.

In summary, most member of the cognizant engines family, such as CPE, CHPE and CTPE provides true real-time, on the fly program monitoring with observability and controllability at the instruction level, and at clock cycle granularity. The cognizant emulator subsystem is design as an add-on or plug-in subsystem to an existing computing system. It provides instruction level observability and controllability of an application or a program loaded and run on said subsystem. Some of the advantages of the cognizant engine family members include:

Providing observability (monitoring) at the deepest level of granularity, the instruction level, and hence, enabling immediate detection of anomalies.

Providing true real-time monitoring of program behavior, at clock cycle granularity.

Providing efficient program monitoring with a low impact on main processor performance. The only impact to the main processor is when it is interrupted or halted by the probe due the detection of a critical event, which does mot occur very often.

Requiring many order less power relative to software emulation/virtual-machine approaches for similar performance requirements. A very power efficient approaches, applicable to mobile devices.

Hardware based isolation for the monitoring program, which protects the monitoring program from being tampered, and from exposure to potentially compromised main system's software.

Hardware based monitoring system provides higher capability and performance relative to software base and RDMA based system, while requiring less energy or power.

Providing low action/response latency, due to the fact that probes can be programmed to take immediate action, by halting or interrupting the processor, within 2 to 3 cycles latency. Low response/action latency, along with immediate detection, reduces the potential of compromise to the monitored kernel/OS/application to minimal, hence simplifying and reducing self-healing effort.

Providing controllability at the finest granularity. The monitoring core can modify all of main processor resources, including but not limited to main memory, control and status registers, register files, caches, etc.

Providing full control over program execution path. The fact that monitoring core can access (write) branch status register, and other main processor's control and data resources, it can steer the program execution path. The monitor can force the main processor to 'lie' to the application and/or system (OS) software running on it. This feature is valuable in defeating the VM avoidance logic employed by advanced malwares.

Although the description above contains many specificities, these should not be construed as limiting the scope of the invention, but as merely providing illustrations of some of the presently preferred embodiments of this invention. The scope of the invention should be determined by the appended claims and their legal equivalents, rather than by the examples given.

I claim:

1. A computing system comprising:
a first hardware processor configured to execute a program;
first electronic resource coupled to the first hardware processor and configured to store or transport data or instructions used by the first hardware processor for execution of the program;
programmable hardware probing circuitry coupled to the first hardware processor or the first electronic memory, the programmable hardware probing circuitry configured to:
monitor execution of the program by the first hardware processor to detect at least a first value or event related to execution of the program,
generate a signal as a result the detection; and
processing circuitry that is separate from the first hardware processor and coupled to the programmable hardware probing circuitry, the processing circuitry programmed to:
receive the signal of the detection of the first value or event by the programmable hardware probing circuitry,
responsive to the signal of the detection of the first value or event, intervene in execution of the program by the first hardware processor,
wherein each instruction of the executing program is monitored on an instruction by instruction basis at clock cycle granularity of the first hardware processor.

2. The computing system of claim 1, wherein the first electronic resource includes: 1) an instruction register; 2) a floating point register; 3) a control and status register; 4) a data bus; 5) an instruction bus; or 6) a memory bus.

3. The computing system of claim 1, wherein the detection of at least the first value or event related to execution of the program includes detection of an executable instruction of the program in the first electronic resource or detection of a value stored or transported in the first electronic resource.

4. The computing system of claim 1, further comprising: isolated addressable electronic memory that is addressable by the processing circuitry that is separate from the first hardware processor, but not accessible by the first hardware processor.

5. The computing system of claim 1, wherein the programmable hardware probing circuitry is further configured to halt execution of the program by the first hardware processor based on detection of an event without waiting for the processing circuitry to intervene in execution of the program.

6. The computing system of claim 1, wherein the processing circuitry is further programmed to intervene in execution of the program by the first hardware processor by interrupting or halting execution of the program by the first hardware processor.

7. The computing system of claim 1, wherein the processing circuitry is further programmed to intervene in execution of the program by the first hardware processor by writing a value or instruction to the first electronic resource for incorporating into subsequent execution of the program by the first hardware processor.

8. A method for monitoring a computer process being executed on a first hardware processor that is coupled to a first electronic resource configured to store or transport data or instructions used by the first hardware processor, the method comprising:
monitoring, by using programmable hardware probing circuitry coupled to the first hardware processor or the first electronic memory, each executing instruction during execution of the program on an instruction by instruction basis and at clock cycle granularity of the first hardware processor;
based on the monitoring, detecting, by the programmable hardware probing circuitry, at least a first value or event stored or transported via the first electronic resource;
generating, by the programmable hardware probing circuitry, a signal as a result of detection of the first value or event;
receiving, at processing circuitry that is separate from the first hardware processor and coupled to the programmable hardware probing circuitry, the signal of the detection of the first value or event by the programmable hardware probing circuitry; and
responsive to reception of the signal of the detection of the first value or event, intervening in execution of the program by the first hardware processor.

9. The method of claim 8, wherein the first electronic resource includes: 1) an instruction register; 2) a floating point register; 3) a control and status register; 4) a data bus; 5) an instruction bus; or 6) a memory bus.

10. The method of claim 8, wherein the detection of at least the first value or event related to execution of the program includes detecting an executable instruction of the program.

11. The method of claim 8, wherein the detection of at least the first value or event related to execution of the program includes detecting a value stored or transported in the first electronic resource as a result of execution of execution of the program.

12. The method of claim 8, further comprising:
as part of intervening, addressing, by the processing circuitry that is separate from the first hardware processor, isolated addressable electronic memory that is not accessible by the first hardware processor.

13. The method of claim 8, further comprising:
halting, by using the programmable hardware probing circuitry, execution of the program by the first hardware processor based on detection of an event without first waiting for intervention by the processing circuitry that is separate from the first hardware processor.

14. The method of claim 8, wherein the intervening includes causing interrupting or halting execution of the program by the first hardware processor.

15. The method of claim 8, wherein the intervening includes causing writing a value or instruction to the first electronic resource for incorporating into subsequent execution of the program by the first hardware processor.

16. A processing system for use with a first hardware processor configured to execute a program, the first hardware processor coupled to a first electronic resource that is configured to store or transport data or instructions used by the first hardware processor for execution of the program, the processing system comprising:
programmable hardware probing circuitry that is separate from and coupled to the first hardware processor or the first electronic memory, the programmable hardware probing circuitry configured to:
monitor execution of the program by the first hardware processor to detect at least a first value or event related to execution of the program,
generate a signal as a result the detection; and
processing circuitry that is separate from the first hardware processor and coupled to the programmable hardware probing circuitry, the processing circuitry programmed to:
receive the signal of the detection of the first value or event by the programmable hardware probing circuitry,
responsive to the signal of the detection of the first value or event, intervene in execution of the program by the first hardware processor,
wherein each instruction of the executing program is monitored on clock cycle granularity of the first hardware processor on an instruction by instruction basis.

17. The processing system of claim 16, wherein the programmable hardware probing circuitry is coupled to at least one of: 1) an instruction register; 2) a floating point register; 3) a control and status register; 4) a data bus; 5) an instruction bus; or 6) a memory bus.

18. The processing system of claim 16, wherein the detection of at least the first value or event related to execution of the program includes detection of an executable instruction of the program in the first electronic resource or detection of a value stored or transported in the first electronic resource.

19. The processing system of claim 16, further comprising:
isolated addressable electronic memory that is addressable by the processing circuitry that is separate from the first hardware processor, but not accessible by the first hardware processor.

20. The processing system of claim 16, wherein the programmable hardware probing circuitry is further configured to halt execution of the program by the first hardware processor based on detection of an event without waiting for the processing circuitry to intervene in execution of the program.

21. The processing system of claim 16, wherein the processing circuitry is further programmed to intervene in execution of the program by the first hardware processor by interrupting or halting execution of the program by the first hardware processor.

22. The processing system of claim 16, wherein the processing circuitry is further programmed to intervene in execution of the program by the first hardware processor by writing a value or instruction to the first electronic resource for incorporating into subsequent execution of the program by the first hardware processor.

* * * * *